(12) United States Patent
Boos

(10) Patent No.: US 7,245,270 B1
(45) Date of Patent: Jul. 17, 2007

(54) ELECTRONIC MEMORANDUM SYSTEM

(76) Inventor: Richard J. Boos, P.O. Box 524, Cresskill, NJ (US) 07626

( * ) Notice: Subject to any disclaimer, the term of this patent is extended or adjusted under 35 U.S.C. 154(b) by 603 days.

(21) Appl. No.: 10/752,926

(22) Filed: Jan. 7, 2004

(51) Int. Cl.
G09G 5/00 (2006.01)

(52) U.S. Cl. ........................................ 345/1.1; 345/173

(58) Field of Classification Search ................. 345/1.1, 345/1.2, 1.3, 2.1, 2.3, 156–173, 179, 2.2
See application file for complete search history.

(56) References Cited

U.S. PATENT DOCUMENTS

| | | | |
|---|---|---|---|
| 4,785,564 A | 11/1988 | Gurtler | |
| D307,134 S | 4/1990 | Makidera | |
| 5,301,915 A | 4/1994 | Bahniuk et al. | |
| 5,408,250 A | 4/1995 | Bier | |
| 5,901,937 A | 5/1999 | Compeau et al. | |
| 5,995,085 A | 11/1999 | Bowen | |
| 6,128,007 A * | 10/2000 | Seybold | 345/179 |
| 6,144,358 A * | 11/2000 | Narayanaswamy et al. | 345/102 |
| 2002/0021258 A1* | 2/2002 | Koenig | 345/1.1 |
| 2004/0001051 A1* | 1/2004 | Tomizawa et al. | 345/173 |
| 2005/0007351 A1* | 1/2005 | Fabrick, II | 345/181 |

* cited by examiner

Primary Examiner—Nitin I. Patel
(74) Attorney, Agent, or Firm—Schmeiser, Olsen and Watts LLP

(57) ABSTRACT

An electronic memorandum system for organizing miscellaneous personal information and messages. The electronic memorandum system includes a data entry device for receiving manual entry of information from a user, and a data display member operationally coupled to the data entry device, which is couplable to a video display monitor. The data display member provides a visual record of the information entered by the user.

19 Claims, 6 Drawing Sheets

ELECTRONIC MEMORANDUM SYSTEM

BACKGROUND OF THE INVENTION

1. Field of the Invention

The present invention relates to electronic organizers and more particularly pertains to a new electronic memorandum system for organizing miscellaneous personal information and messages.

2. Description of the Prior Art

The use of electronic organizers is known in the prior art. U.S. Pat. No. 4,785,564 describes a device for entering information directly into a handheld organizer. Another type of organizer is U.S. Pat. No. 5,901,937 having a means to attach personal items to a computer monitor.

While these devices fulfill their respective, particular objectives and requirements, the need remains for a system that has provides an electronic method of storing information and displaying the information separate from a computer monitor, without unnecessary clutter commonly found with hand written paper notes.

SUMMARY OF THE INVENTION

The present invention meets the needs presented above by providing at least one display separate from a computer monitor for displaying information entered onto an electronic pad.

An object of the present invention is to provide a new electronic memorandum system that provides the benefits of electronic storage with the convenience of hand written notes.

Still another object of the present invention is to provide a new electronic memorandum system that provides a cleaner presentation of user information than usually possible with hand written notes.

To this end, the present invention generally comprises a data entry device for receiving manual entry of information from a user, and a data display member operationally coupled to the data entry device, which is couplable to a video display monitor, The data display member provides a visual record of the information entered by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
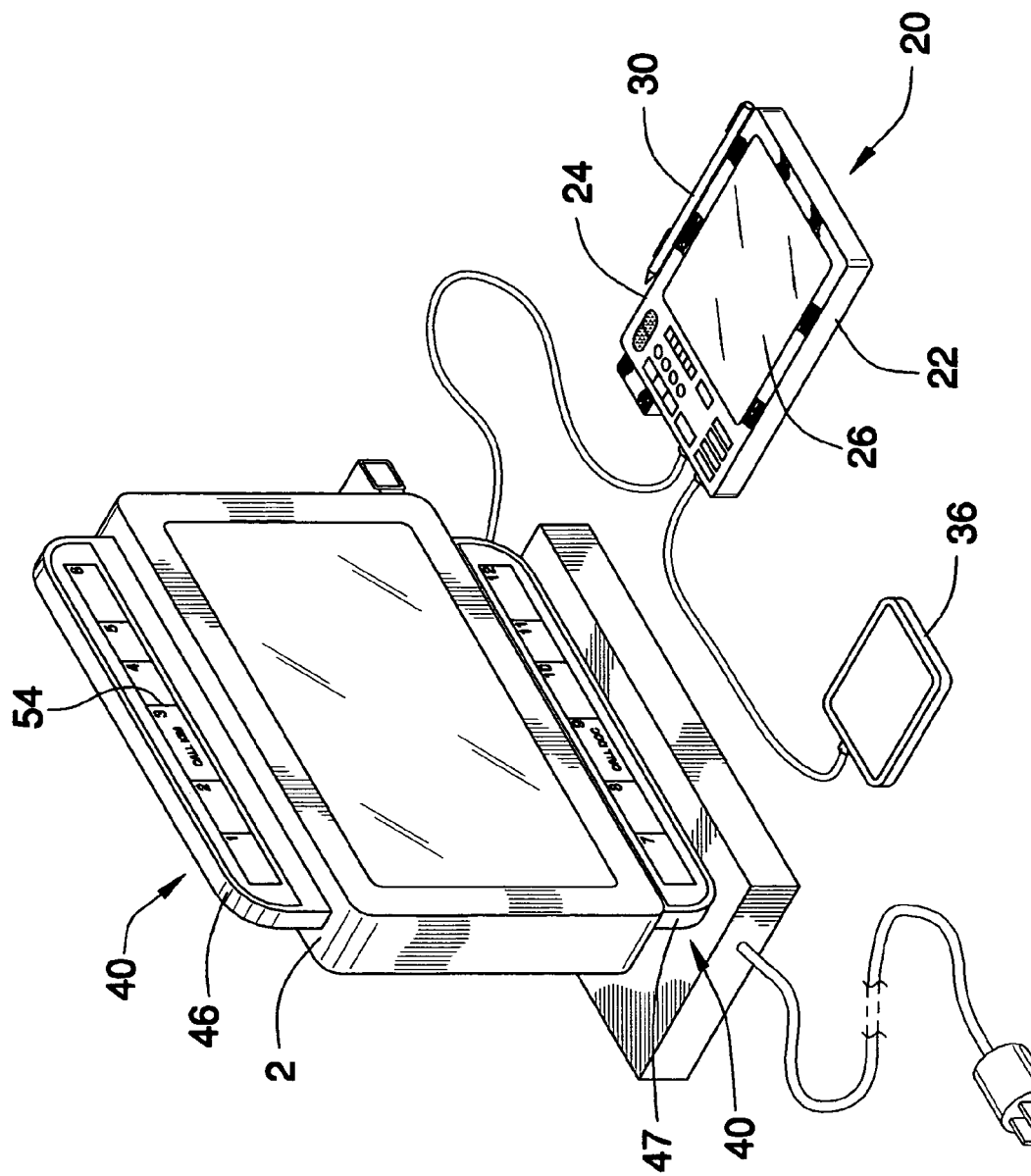
FIG. 1 is a schematic perspective view of a new electronic memorandum system according to the present invention.
Figure 2:
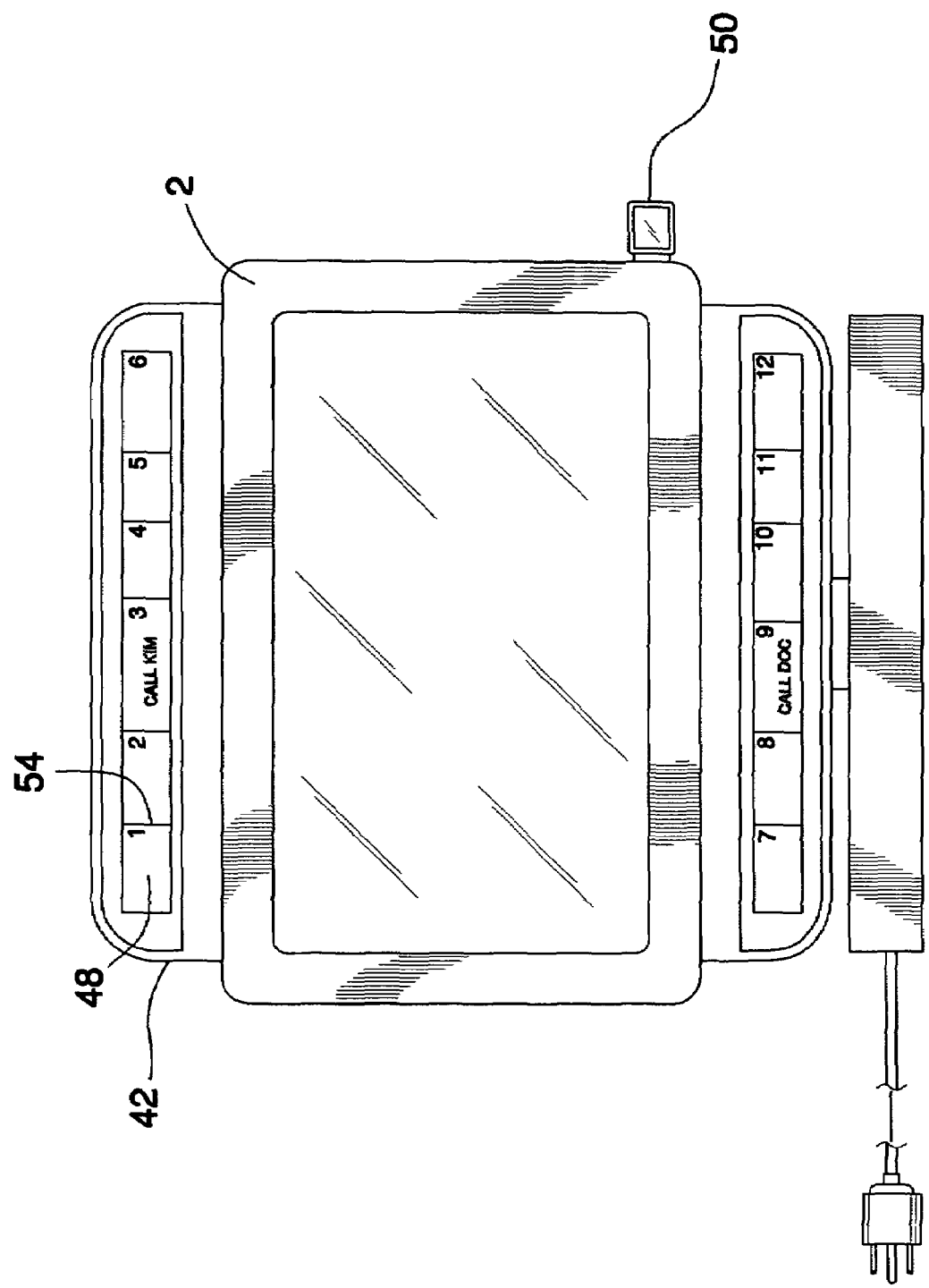
FIG. 2 is a schematic front view of the data display members of the present invention.
Figure 3:
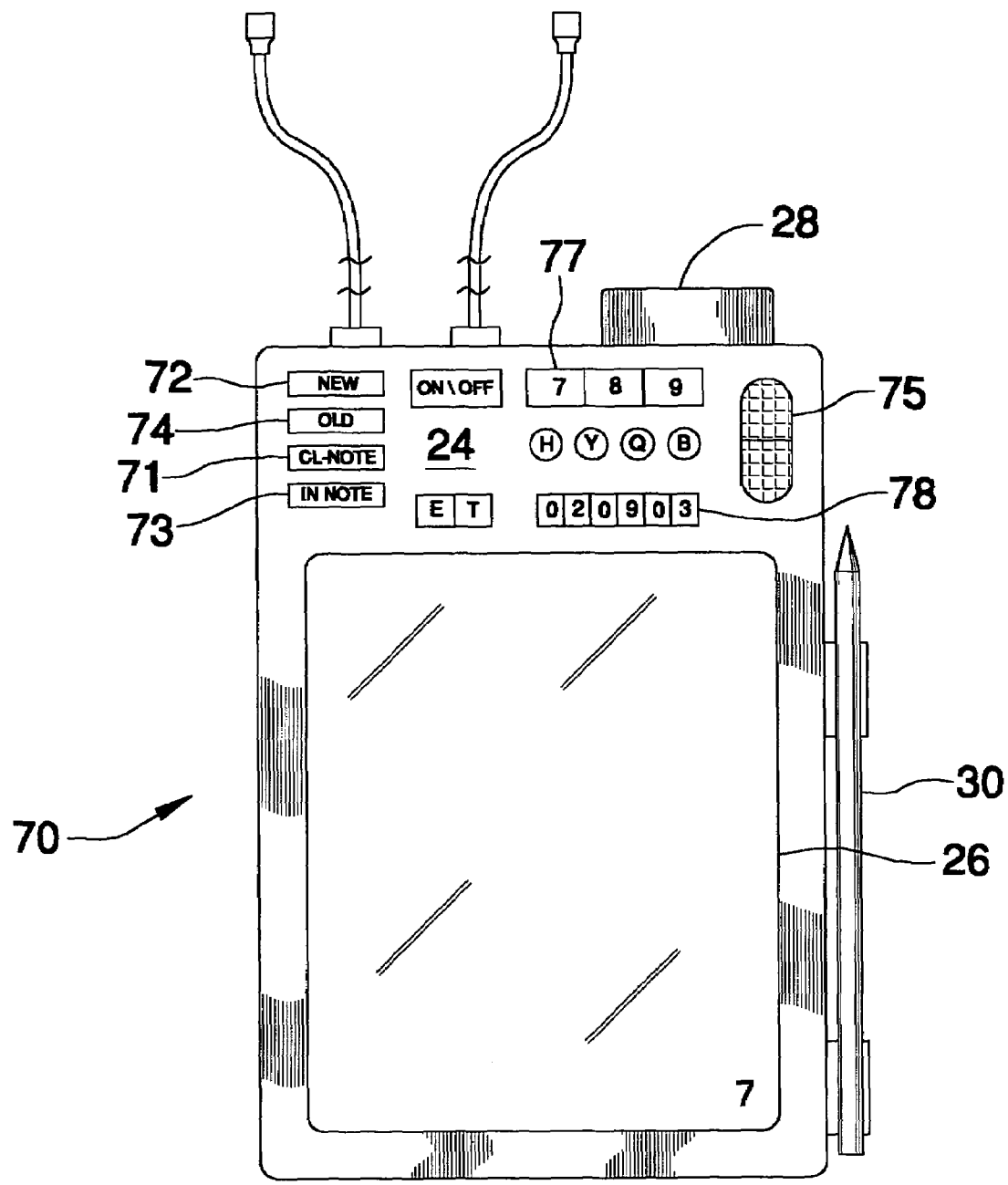
FIG. 3 is a schematic front view of the data entry device of the present invention.
Figure 4:
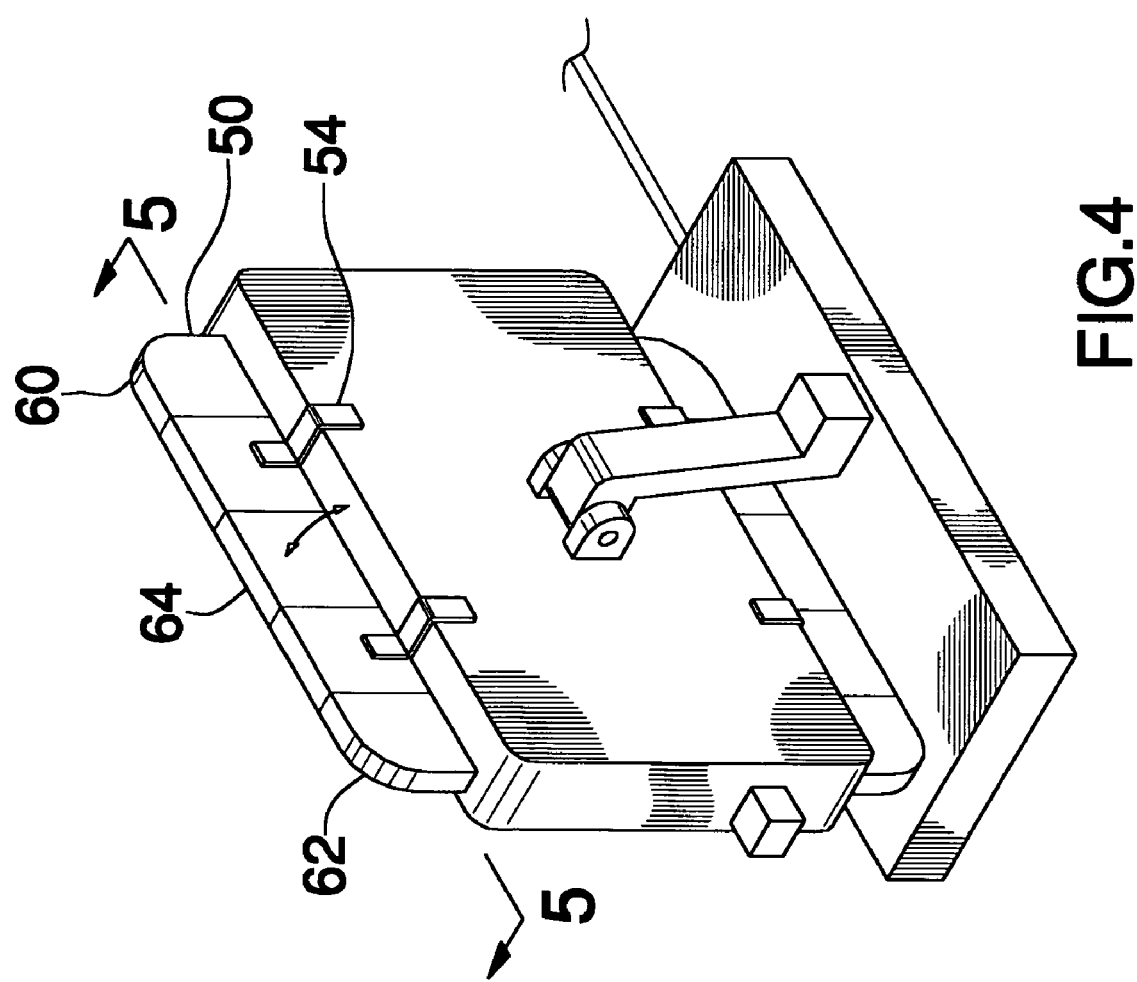
FIG. 4 is a schematic perspective rear view of the present invention.
Figure 5:
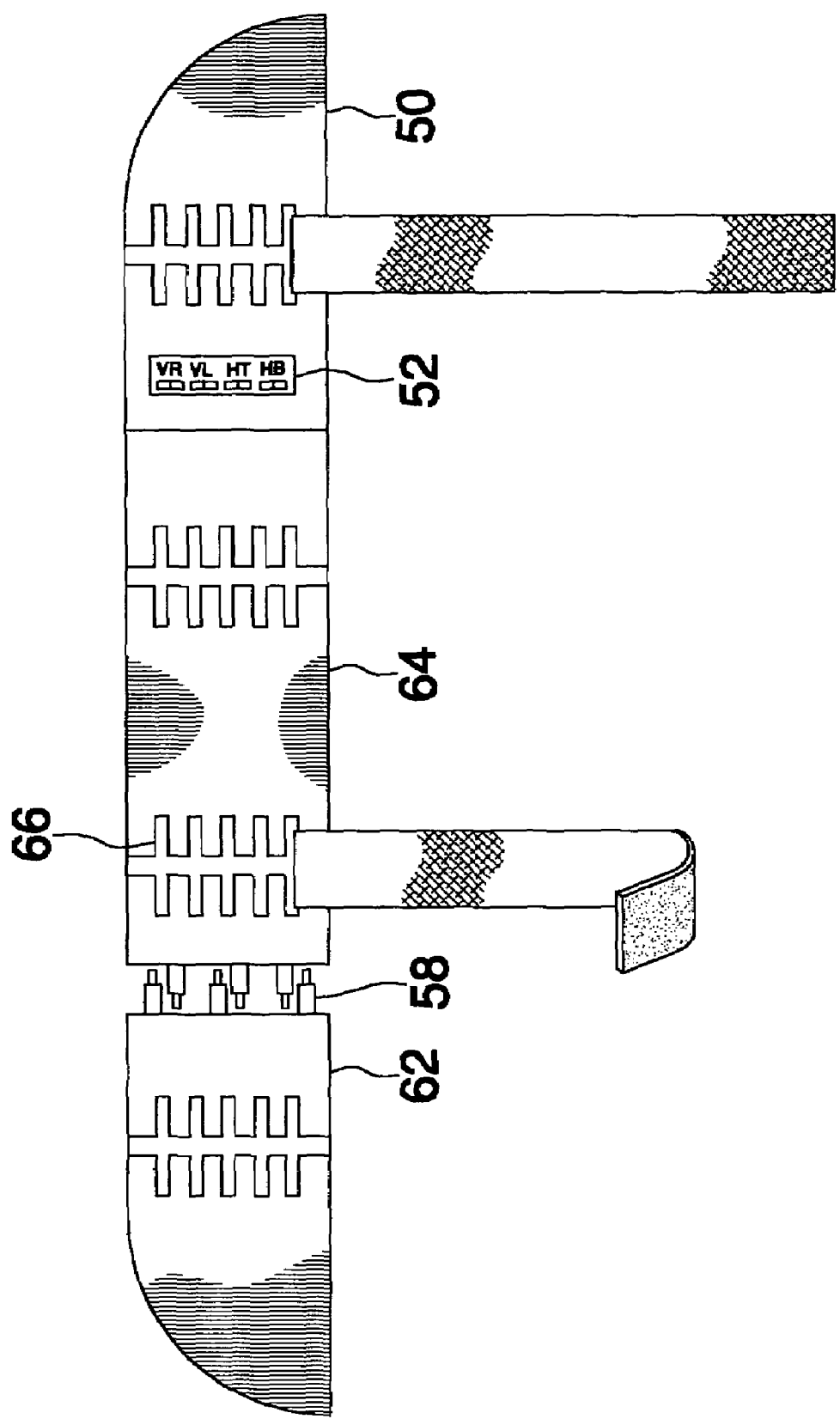
FIG. 5 is a schematic exploded perspective view of a data display member of the present invention.
Figure 6:
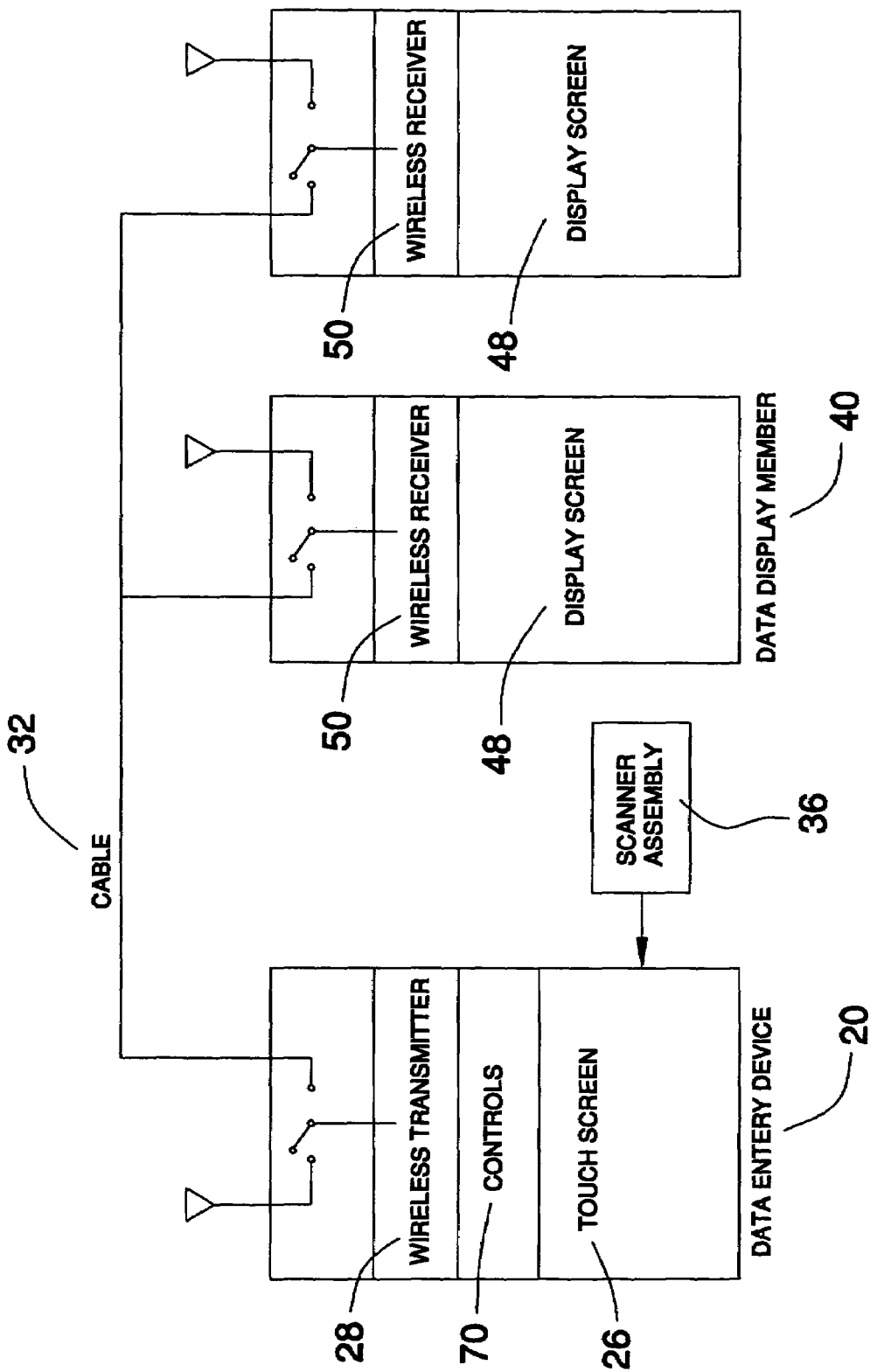
FIG. 6 is a functional interconnect diagram of the present invention.

With reference now to the drawings, and in particular to FIGS. 1 through 6 thereof, a new electronic memorandum system embodying the principles and concepts of the present invention and generally designated by the reference numeral 10 will be described.

As best illustrated in FIGS. 1 through 6, the electronic memorandum system 10 generally comprises a data entry device 20 and a pair of data display members 40.

The data entry device 20 is for receiving manual entry of information from a user. The data entry device 20 includes a housing 22 designed for resting upon a horizontal surface and has a top surface 24. The data entry device 20 includes a touch screen 26 which is preferably operationally coupled to the top surface 24 the touch screen 26 facilitates capture of information written on the touch screen 26 by a user.

Each one of the pair of data display members 40 is preferably operationally coupled to the data entry device 20. Each one of the data display members 40 is couplable to an associated side of a video display monitor 2. The data display members 40 provide a visual record of the information entered by the user. Each of the data display members 40 includes a housing 42 operationally couplable to an associated side of a video display monitor 2. The housing 42 includes a back wall 44 and a perimeter wall 46 which extends outwardly from a perimeter edge of the back wall 44. Each one of the pair of data display members 40 includes a display screen 48 positioned within the housing 42 and abutting the perimeter wall 46 such that the display screen 48 is visible from a front of the housing 42.

In an embodiment the data entry device 20 further comprises a stylus member 30 for facilitating entry of the information onto the touch screen 26. The stylus 30 is designed for being grasped by a human hand.

In a further embodiment the data entry device 20 includes a wireless transmitter member 28. The wireless transmitter member 28 is for transmitting the information entered by the user to the data display members 40. Similarly, the data display members 40 each include a wireless receiver 50 for receiving the information transmitted by the wireless transmitter 28.

In yet a further embodiment each one of the data display members 40 is pivotally coupled to an associated side of the video display monitor 2. Thus, the data display member 40 can be pivoted to a stored position defined by the back wall 44 abutting a side of the video display monitor 2.

Preferably the position of an item of user information is selectable by the user on either one of the pair of data display members 40.

In a further embodiment, the data entry device 20 may be coupled to each one of the data display members 40 via a cable 32. This embodiment is particularly useful for high electronic noise environments or where increased privacy is desired.

Additionally, the data entry device 20 may have a keyboard functionality allowing the user to "type" the desired information by selecting characters on the data entry device 20 with the stylus 30. This same functionality may be used for a menu functionality for setting up and maintaining the system 10.

In an embodiment each one of the pair of data display members 40 further includes a selection means 52 for adjusting an orientation of text being displayed for a vertical orientation when the data display member 40 is coupled to a vertical side of the video display monitor 2 or a horizontal orientation when the data display member 40 is coupled to a horizontal side of the video display monitor 2. The selection means 52 may be a dip switch, multi-positional switch, mercury switch, or any other appropriate orientation indicating switch.

In a further embodiment the selection means 52 facilitates designation of each one of the data display members 40 between a right data display member, to be attached to the right side of the video display monitor 2, and a left data display member to be attached to the left side of the video display monitor 2.

In still a further embodiment the selection means 52 facilitates designation of each one of the data display members 40 between a top data display member, to be attached to the top of the video display monitor 2, and a bottom data display member to be attached to the bottom of the video display monitor 2.

In a preferred embodiment each one of the pair of data display members 40 further comprises a first end portion 60, a second end portion 62, and a plurality of intermediate portions 64. The first end portion 60 may be aligned adjacent to a selected corner of the video display monitor 2. Similarly, the second end portion 62 may be aligned adjacent to a second selected corner of the monitor 2. Each one of the plurality of intermediate portions 64 is serially couplable between the first end portion 60 and the second end portion 62. The overall length of the data display monitor 40 is determined by the number of intermediate portions 64 used. Thus the overall length of each of the data display members 40 is adjustable.

In an embodiment each one of the pair of data display members 40 further comprises at least one bracket member 54 and at least one slot array 66. The bracket members 54 include a coupling means 55, for coupling the housing 42 of the data display member 40 to the video display monitor 2, and a tab portion 56. The slot arrays 66 are positioned on the back wall 44 of the housing 42 of the data display member 40, and provide multiple interface points 68 between the tab portion 56 and the housing 42 of the data display member 40. The tab portion 56 is selectively receivable in a selected one of the interface points 68.

In a further embodiment the bracket member 54 is formable to a contour of the video display monitor 2 to maximize a surface area of the bracket member 54 in contact with the video display monitor 2.

Preferably the coupling means 55 further comprises a clay type adhesive for removably coupling the bracket member 54 to the video display monitor 2. While the clay type adhesive is preferred, other coupling means including double stick tape, hook and loop fastener, liquid adhesive, screws, or clips may also be used.

The tab portion further comprising a pair of pin members 58 extending outwardly from an associated end of the tab portion 56. The pin members 58 are biased outwardly, and are positionable in the tab portion 56. The pin members 58 facilitate engagement between the tab portion 56 and the interface points 68.

A scanner assembly 36 may be operationally coupled to the data entry device 20 for converting pre-printed text to an input for the data entry device 20.

In an embodiment the data entry device 20 further comprises a multiplicity of controls. This multiplicity of controls may include a scroll control 75, edit controls 70, color selection controls 76, and multiple display segments 77,78. The scroll control 75 is used for facilitating scrolling through previously entered visual records entered by the user. The plurality of edit controls 70 is used for facilitating management of visual records. The plurality of edit controls may include a new visual record selection control 72 to facilitate entry of new information by the user into a new visual record, an existing visual record selection control 74 to facilitate review and editing of an existing visual record, a delete visual records control 73 for facilitating deletion of visual records from the data display members 40, and a clear pad control 71 to clear information entered on the data entry device 20. The multiple display segments may include a note number display segment 77 to provide a visual indication of a control number associated with the visual record; and a date display segment 78 for providing a visual indication of a date associated with the visual record. The color selection control 76 is used for facilitating selection of a background color to be associated with the visual record displayed on the data display member 40.

Finally, the system 10 may be coupled to a PDA, handheld computer, notebook, or desktop computer to share information.

In use, the user grasps the stylus in a manner similar to a convention pen. The user uses the stylus to write or "type" the desired information on to the touch screen. The information is then displayed on a selected area of the data display members.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic memorandum system for display and storage of information comprising:
    a data entry device for receiving manual entry of information from a user;
    a pair of data display members, each one of said pair of data display members being operationally coupled to said data entry device, each one of said data display members being couplable to an associated side of a video display monitor, said data display members providing a visual record of the information entered by the user,
    wherein each one of said pair of data display members further comprises:
    a first end portion alignable adjacent to a corner of the video display monitor;
    a second end portion alignable adjacent to a second corner of the video display monitor; and
    a plurality of intermediate portions, each one of said plurality of intermediate portions being serially couplable between said first end portion and said second end portion, wherein an overall length of said data display members is adjustable by adding or removing one or more of the plurality of intermediate portions.

2. The system of claim 1, wherein said data entry device further comprises a touch screen and a stylus member for facilitating entry of the information onto said touch screen.

3. The system of claim 1, further comprising:
wherein said data entry device having a wireless transmitter member, said wireless transmitter member being for transmitting the information entered by the user to said data display members;
wherein at least one of said data display members having a wireless receiver for receiving the information transmitted by said wireless transmitter.

4. The system of claim 1, wherein each one of said data display members being pivotally coupled to said associated side of the video display monitor whereby said data display members can be pivoted to a stored position.

5. The system of claim 1, wherein a position of an item of user information is selectable by the user on either one of said pair of data display members.

6. The system of claim 1, wherein each one of said pair of data display members further comprises:
at least one bracket member with a coupling means for coupling a housing of said data display member to the video display monitor, said bracket member having a tab portion; and
at least one slot array positioned on a back wall of said housing of said data display member, said slot array providing multiple interface points between said tab portion and said housing of said data display member, said tab portion being selectively receivable in a selected one of said interface points.

7. The system of claim 6, wherein said bracket member being formable to a contour of the video display monitor to maximize a surface area of said bracket member in contact with the video display monitor.

8. The system of claim 6, wherein said coupling means further comprises a clay type adhesive for removably coupling said bracket member to the video display monitor.

9. The system of claim 6, wherein said tab portion further comprising a pair of pin members, each one of said pin member extending outwardly from an associated end of said tab portion, said pin members being biased outwardly, said pin members being positionable in said tab portion, said pin members facilitating engagement between said tab portion and said interface points.

10. The system of claim 1, further comprising a scanner assembly operationally coupled to said data entry device, said scanner assembly converting printed text to an input for said data entry device, said scanner assembly facilitating capture of pre-printed information.

11. The system of claim 1, wherein said data entry device further comprises:
a scroll control for facilitating scrolling through previously entered visual records entered by the user;
a plurality of edit controls for facilitating management of visual records, said plurality of edit controls including a new visual record selection control to facilitate entry of new information by the user into a new visual record, an existing visual record selection control to facilitate review and editing of an existing visual record, a delete visual records control for facilitating deletion of visual records from said data display members, and a clear pad control to clear information entered on said data entry device;
a note number display segment to provide a visual indication of a control number associated with said visual record;
a date display segment for providing a visual indication of a date associated with said visual record; and
a color selection control for facilitating selection of a background color to be associated with said visual record displayed on said data display member.

12. An electronic memorandum system for display and storage of information comprising:
a data entry device for receiving manual entry of information from a user;
at least one data display member operationally coupled to said data entry device, said data display member being couplable to a video display monitor, said data display member providing a visual record of the information entered by the user,
wherein an overall length of the at least one data display member is adjustable by adding or removing one or more of a plurality of intermediate portions.

13. The system of claim 12, wherein said data entry device further comprising:
a housing adapted for resting upon a horizontal surface, said housing having a top surface; and
a touch screen being operationally coupled to said top surface said touch screen facilitating capture of information written on said touch screen by said user.

14. The system of claim 13, wherein said data entry device further comprises a stylus member for facilitating entry of the information onto said touch screen, said stylus being adapted for being grasped by a human hand.

15. The system of claim 12, further comprising:
wherein said data entry device having a wireless transmitter member, said wireless transmitter member being for transmitting the information entered by the user to said data display member;
wherein said data display member having a wireless receiver for receiving the information transmitted by said wireless transmitter.

16. The system of claim 12, wherein said data display member further comprises:
a housing operationally couplable to the video display monitor, said housing having a back wall and a perimeter wall extending outwardly from a perimeter edge of said back wall;
a display screen positioned within said housing and abutting said perimeter wall such that said display screen is visible from a front of said housing.

17. An electronic memorandum system for display and storage of information comprising:
a data entry device for receiving manual entry of information from a user; and
a pair of data display members, each one of said pair of data display members being operationally coupled to said data entry device, each one of said data display members being couplable to an associated side of a video display monitor, said data display members providing a visual record of the information entered by the user,
wherein each one of said pair of data display members further comprises a selection means for adjusting an orientation of text being displayed for a vertical orientation when said data display member is coupled to a vertical side of the video display monitor or a horizontal orientation when said data display member is coupled to a horizontal side of the video display monitor.

18. The system of claim 17, wherein said selection means facilitates designation of each one of said data display members between a right data display member and a left data display member.

19. The system of claim 17, wherein said selection means facilitates designation of each one of said data display members between a top data display member and a bottom data display member.

* * * * *